March 17, 1953     M. L. PINKSTON     2,631,800
MOTOR MOUNT FOR POWER TOOLS
Filed Aug. 19, 1950
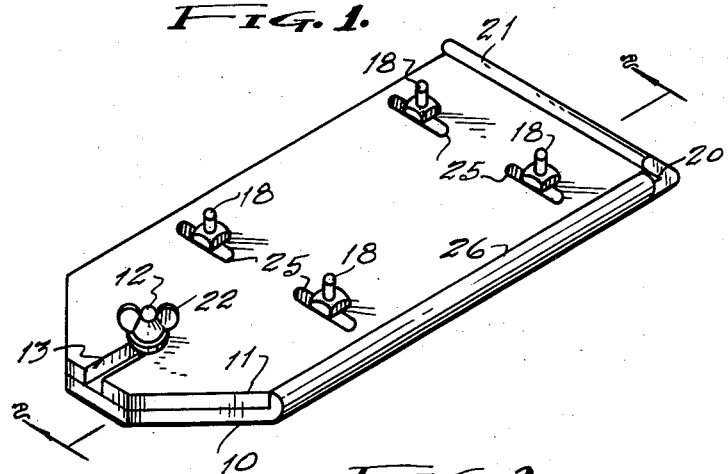
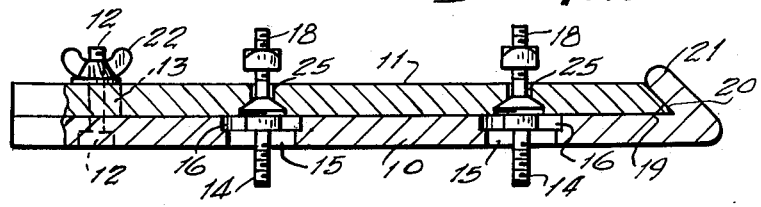
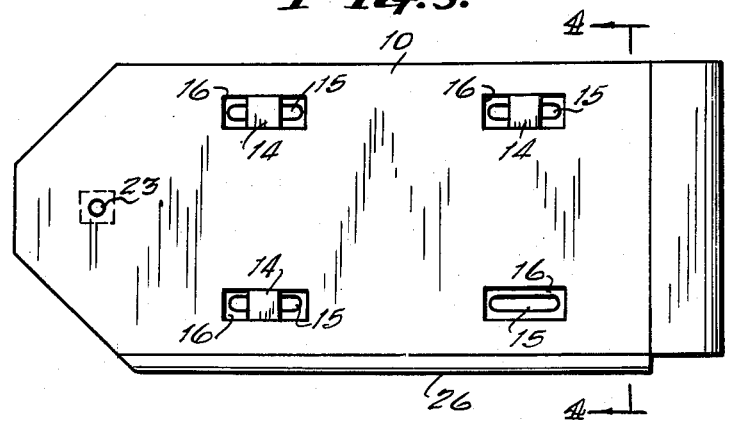
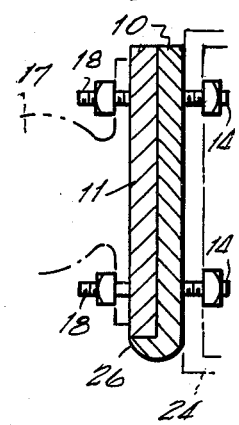
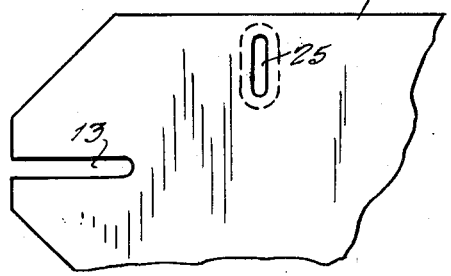
*Murlin L. Pinkston*
INVENTOR.
BY
ATTORNEY Patented Mar. 17, 1953

2,631,800

UNITED STATES PATENT OFFICE 2,631,800

MOTOR MOUNT FOR POWER TOOLS

Murlin L. Pinkston, Fort Worth, Tex.

Application August 19, 1950, Serial No. 180,411

2 Claims. (Cl. 248—23)

This invention relates to motor supporting devices for power machines, such as saws, lathes, and the like, and its primary object resides in the provision of a mounting device by which a single motor can be employed to operate several different machines, affording a device by which an electric motor may be attached to the mounting with a minimum of effort and detached as readily and transferred to another machine by simply removing a single bolt.

Another object of the invention is that of providing a mounting which comprises a plate capable of securement to the machine on which the motor is mounted and having means thereon for attachment of a securing plate for the said motor, and means in the said plates providing for adjustment of the motor securing plate with respect to the said mounting plate whereby the motor can be adjusted with respect to said mounting plate and the machine which the motor is required to operate.

It is an object of the invention to provide a mounting device for electric motors by which several different machines can be operated, at different times, by a single motor which is capable of being transferred from one machine to another without removing the mounting bolts of the motor and thus providing a convenient and economical means for operating a maximum number of machines with a minimum number of motors.

Broadly, the invention contemplates the provision of a device by which an electric motor may be detachably installed and properly adjusted with a minimum of time and effort.

While the foregoing objects are paramount, other and lesser objects will become manifest as the description proceeds, taken in connection with the appended drawings wherein:

Figure 1 is a perspective illustration of the invention showing the motor base plate attached to the mounting plate.

Figure 2 is a longitudinal cross-sectional illustration of the motor base plate and the mounting plate in operative association, taken on lines 2—2 of Figure 1.

Figure 3 is a plan view of the mounting plate showing the motor mounting plate removed.

Figure 4 is a transverse sectional view of the assembly, on lines 4—4 of Figure 3, showing a motor in dotted lines, supported on the motor base plate, and Figure 5 fragmentarily illustrates the underside of the motor base plate showing one of the slots for the motor bolts.

The invention comprises a pair of plates 10 and 11 which are detachably associated by a bolt 12 arranged through the mounting plate 10 and extending through a slot 13 in the motor base plate 11. The mounting plate 10 has a plurality of bolts 14 arranged through slots 15 therein, as shown in Figures 2 and 3, and such bolts are arranged in pairs aligned across the front and rear portions of the plate and spaced longitudinally thereof. The heads of the bolts are polygonal, as shown in Figure 3, and are disposed in elongated recesses 16 formed about the slots 15 in the inner surface of the plate 10.

The motor base plate 11, to which the motor 17 is secured by bolts 18, is associated with the mounting plate 10 in the manner shown in Figures 2 and 4. The rearmost edge 19 of the plate 11 is bevelled and is adapted to extend into the substantially V-shaped groove 20 formed by the flange 21 integral with and arranged along the rearmost edge of the plate 10. The forward ends of both plates 10 and 11 are angular in form, as shown in Figure 3, and the bolt 12 in the base plate 11 is arranged therebetween and has a wing nut 22 threaded thereon. The bolt 12 is arranged through an aperture 23 in the plate 10, as shown in Figures 2 and 3.

The mounting 10 is secured by the bolts 14 to a machine 24, shown in dotted lines in Figure 4, and may be adjusted, if desired, by the use of the slots 15. The motor base plate 11 is supported on the mounting plate 10 and secured by the bolt 12 and the flange 21 in the arrangement illustrated in Figure 2. The motor 17 can be adjusted on the plate 11 by moving the bolts 18, by which it is secured, along the slots 25 arranged transversely of the plate 11 and spaced apart as illustrated in Figure 1.

A flange 26 may be formed along one longitudinal edge of the mounting plate 10, if desired, by which the motor base plate 11 can be supported when the assembly is arranged in the manner illustrated in Figure 4. Only one or two lugs may be employed instead of the flange 26, or the bolts 18 can serve to retain the plate 11 in position on the plate 10, supporting both the plate 11 and the motor 17.

Manifestly, the structure herein shown and described is capable of certain changes and modifications without departing from the spirit and intent of the invention or the scope of the appended claims.

What is claimed is:

1. In a motor mounting assembly for power machines, in combination, a mounting plate adapted to be removably attached to a power machine and capable of adjustment thereon, the said mounting plate having a flange on one end defining a V-shaped groove, a motor base plate having means thereon for detachably and adjustably mounting a motor thereon and having one end bevelled and engageable in said groove for detachable securement to said base plate, a bolt in said mounting plate opposite said groove and a slot for said bolt in said base plate providing, means whereby said motor base plate can be attached and detached from said mounting plate.

2. In a motor mounting device for power machines, a mounting plate having means thereon for detachably and adjustably securing the same to a machine, a flange formed along one end of said mounting plate and inclined inwardly thereover, a motor base plate having means thereon conformable to said flange and engageable therewith, a bolt in said mounting plate arranged in a slot in said base plate opposite said flange for detachably securing said base plate in cooperation with said flange, and means in said base plate for detachably and adjustably securing a motor thereto.

MURLIN L. PINKSTON.

REFERENCES CITED

The following references are of record in the file of this patent:

UNITED STATES PATENTS

| Number | Name | Date |
|---|---|---|
| 171,226 | Liebich | Dec. 30, 1902 |
| 2,456,039 | Abramson | Dec. 14, 1948 |
| 2,510,680 | Byrnes | June 6, 1950 |